INVENTOR.
ALBERT BOUWERS
BY
Arthur B. Colvin
ATTORNEY

United States Patent Office 3,509,344
Patented Apr. 28, 1970

3,509,344
DEVICE WITH A NIGHT TELESCOPE
Albert Bouwers, Den Haag, Netherlands, assignor to N.V. Optische Industrie "De Oude Delft," Delft, Netherlands, a Dutch corporation
Filed May 17, 1967, Ser. No. 639,125
Claims priority, application Netherlands, May 18, 1966, 6606802
Int. Cl. G01t 1/16
U.S. Cl. 250—83.3                        1 Claim

ABSTRACT OF THE DISCLOSURE

A two stage electron-optical night telescope for passive use is combined with an infra-red search light and an infrared image converter producing a visible image of the irradiated area. The latter image can be momentarily presented to the second stage of the passive telescope instead of the first stage passive image, in order to improve the perceptability of e.g. objects under trees.

---

This invention relates to a device comprising an electron-optical night telescope of the so-called passive type. As is well-known such telescopes utilize solely the scarce natural light available at night. They include an image intensifier tube with a photo-cathode sensitive for as large a spectral region as possible and which receives an image of the scene to be observed from an optical system of the high luminosity. Often the image appearing on the fluorescent screen of the intensifier tube is further intensified by a second image intensifier tube before it is finally viewed through a suitable magnifier.

Experience has shown that excessive differences in brightness may occur in the field of view of such telescopes which use solely the natural light of moon and stars. Of this light e.g. very little penetrates a dense foliage so that objects under trees can not be seen clearly. The performance on such objects might be improved by additionally irradiating the objects with search-lights. If it is important to avoid detection primarily infra-red rays should be used for that purpose and the periods of irradiation should be kept as short as possible.

It has not been readily possible up to now to produce photo-cathodes exhibiting sufficient sensitivity not only in a broad visible spectrum but at the same time also in the near infra-red. Accordingly, if the above indicated technique of short irradiations should be applied to objects whose visibility in the passive telescope is poor, a separate telescope for observations in the infra-red must be provided. The resulting apparatus would be expensive and very difficult to use.

The present invention has for its object to provide a device which overcomes largely the above mentioned deficiencies. The invention starts from a device comprising an eletcron-optical night telescope for observation with the aid of naturally available light (passive night telescope), which device includes: a first image intensifier tube whose photo-cathode is substantially non-sensitive to infra-red rays; a front objective for such first tube; a second image intensifier tube which is optically coupled to the first image intensifier tube by means of a coupling objective consisting of two parts so constructed and placed that between the two parts the light beams are parallel; means including a magnifier to enable the observer to view the final image produced by the second intensifier tube.

In accordance with the invention the device further comprises: an infrared unit including an image converter tube with a photo-cathode sensitive to infrared rays and receiving an image from a separate front objective whose optical axis is parallel to the optical axis of the front objective of the passive telescope; a collimation objective whose focal plane coincides with the image screen of the image converter tube; means to selectively transmit either the parallel beams from the first part of the coupling objective or those from the collimation objective into the second part of the coupling objective, which means include a movable flat reflecting surface such as a mirror; an infra-red search light mounted on the passive telescope, so as to produce a beam which is parallel to the optical axis of the passive telescope.

The invention will be discussed in greater detail with reference to the drawing in which.

Figure 1:
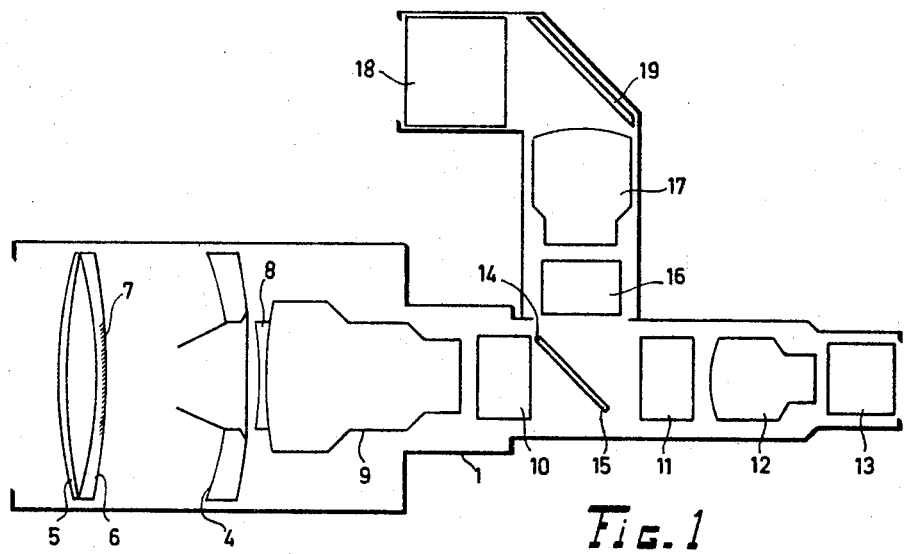
FIG. 1 is a longitudinal cross-sectional view along the plane I—I in FIG. 2 of a device constructed in accordance with the invention.
Figure 2:
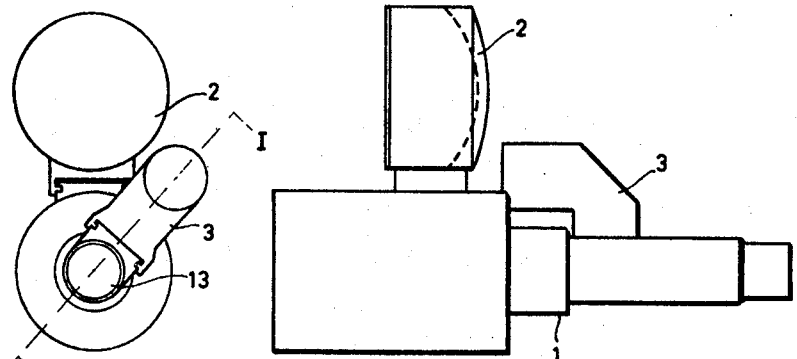
FIG. 2 is a rear elevational view of the device shown in FIG. 1.
Figure 3:
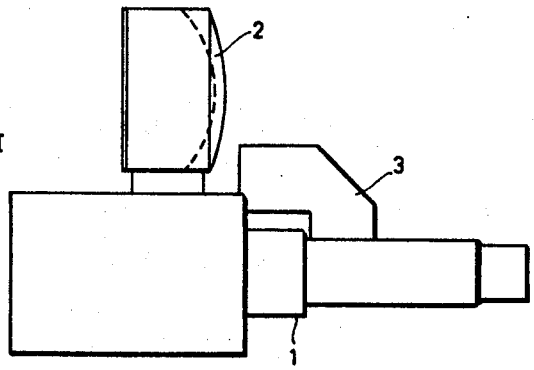
FIG. 3 is a side elevational view of the same device.

The device comprises three main units, i.e. the passive night telescope 1, the infrared search light 2 and the infra-red unit 3 receiving an infra-red image of the scene irradiated by the search light 2 and converting the same into a visible image. The high aperture front objective of the passive telescope includes a concave mirror 4, two correcting lenses 5 and 6, a secondary mirror 7 on the convex rear surface of the lens 6, and a field curvature correcting lens 8. This front objective projects an image of the scene to be observed on the photo-cathode of a first image intensifier tube 9. This photo-cathode is sensitive in as large a spectral region as possible which however, in the present state of the art does not include the near infra-red. A pair of mutually similar objectives 10 and 11 acts as a coupling objective imaging the anode screen of the tube 9 at unit magnification on the photo-cathode of a second image intensifier tube 12. Between the parts 10 and 11 the light beams are parallel. The anode screen image of the second tube 12 can be viewed through a magnifier 13.

Between the parts 10 and 11 of the coupling objective there is sufficient space to accommodate a flat mirror 15. Mirror 15 is hinged at 14 and can be placed in the position shown in FIG. 1 in which it is at 45° with respect to the optical axis of the passive telescope. Alternatively, mirror 15 can be set parallel to that axis so that the optical path from lens 10 to lens 11 is not obstructed. By means of this mirror 15 in the 45°-position and a collimation objective 16 it is possible to couple optically the photo-cathode of the second image intensifier tube with the image screen of an infra-red image converter tube 17. The photo-cathode of this latter tube receives an infrared image from a separate front object 18 whose optical axis is made parallel to the axis of the passive telescope by means of a flat mirror 19. Apart from a certain parallax which is not of any importance when relatively distant objects are observed, the passive image and the infra-red image which can alternatively be viewed through the magnifier 13 will always have the same center. The same holds for the field irradiated by the search light 2 since the latter is so mounted on the passive telescope that its beam axis is parallel to the axis of the two front objectives.

The changing over from one image to the other is simple and can be done practically without any interruption of the observation. It involves turning the mirror 15 through 45° (which could, of course, be changed for a sliding movement), and switching on or off the image tubes 9 and 17, and the search light 2. Preferably, these actions will be combined in any manner known per se so that the observer has to perform one single operation, such as turning a knob.

In some instances the front objective 18 of the image converter tube can be selected to have a smaller relative aperture than the front objective of the passive telescope. Further, the overall magnification of the device when viewing via the infra-red unit is not necessarily equal to that of the passive telescope. It may be even advantageous to select a somewhat greater magnification for the infra-red case since the object which it is desired to irradiate with infra-red rays will generally not cover the whole field of the passive telescope and one may desire to observe such details at as great a magnification as possible.

What I claim is:

1. A device comprising an electron-optical night telescope adapted to utilize the naturally available light (passive night telescope) including: a first image intensifier tube with a photo-cathode which is substantially non-sensitive to infra-red rays; a front objective for said first image intensifier tube; a second image intensifier tube which is optically coupled to said first image intensifier tube by means of a coupling objective consisting of two parts between which the light beams are parallel; and means including a magnifier to observe the image produced by said second image intensifier tube, said device being characterized in that it further comprises: an infra-red unit including an image converter tube with a photo-cathode sensitive to infra-red rays and a front objective for said image converter tube, said unit being mounted on said passive night telescope such that the optical axis of said front objective for said image converter tube is parallel to the optical axis of said front objective for said first image intensifier tube; a collimation objective having its focal plane coinciding with the image screen of said image converter tube; means including a movable flat reflecting surface to selectively direct either the parallel beams leaving the first part of said coupling objective or the parallel beams leaving said collimation objective into the second part of said coupling objective; and a source of infra-red rays adapted to produce a concentrated beam of such rays, said source being mounted on said passive night telescope so that the axis of said beam is parallel to the optical axis of said passive night telescope.

References Cited

UNITED STATES PATENTS

| | | | |
|---|---|---|---|
| 3,124,682 | 3/1964 | Kojima et al. | 250—213 X |
| 2,605,335 | 7/1952 | Greenwood et al. | 250—213 X |

RALPH G. NILSON, Primary Examiner

D. L. WILLIS, Assistant Examiner

U.S. Cl. X.R.

250—213